Figure 1:
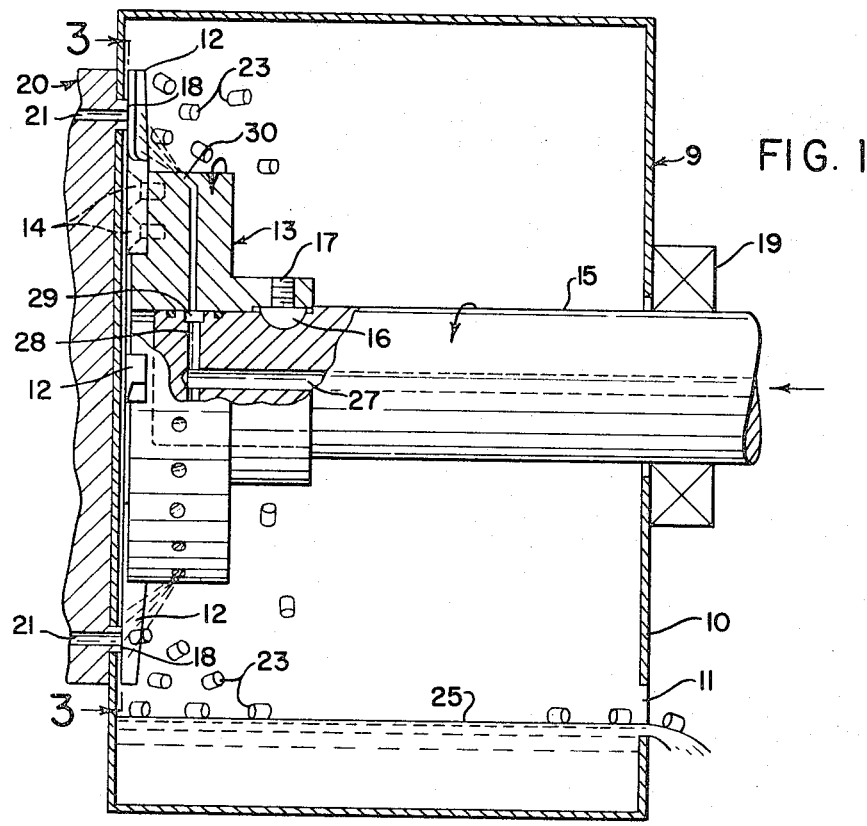

Sept. 19, 1967  T. S. MAYNER  3,341,892

PELLETIZING APPARATUS

Filed Feb. 23, 1965  2 Sheets-Sheet 1

INVENTOR.
THOMAS S. MAYNER
BY Irvin L. Groh
ATTORNEY

INVENTOR.
THOMAS S. MAYNER
BY Irvin L. Groh
ATTORNEY

ThomasS. Mayner, Chagrin Falls, Ohio, assignor to Midland-Ross Corporation, Cleveland, Ohio, a corporation of Ohio
Filed Feb. 23, 1965, Ser. No. 434,544
4 Claims. (Cl. 18—12)

This invention relates to the pelletization of thermoplastic polymeric materials and, more particularly, to a method and an apparatus for converting such materials into granular form suitable for use with extruders for use in blow molding or compression molding.

A quality that is required of pelletized thermoplastic polymeric material is free flowing ability which among other factors is the result of shape and size uniformity. Continuous and even supply to an extruder or an injection apparatus is a requirement in the production of products having desirable and uniform physical characteristics. The pellet particles should also not only be of uniform size but free from dust and fines since the ultimate uniformity and toughness of the final article is dependent upon the uniform and continuous flow into the extruder melter. By means of this invention, the requirements are generally met.

Polymeric materials forming a thermoplast group such as polyethylene, polypropylene, polyesters, polymers of acrylonitriles, polyamides, polyvinyl chloride, etc. are generally initially converted into pellet form for later use in extruding and injection apparatus. The thermoplasts are first extruded in the form of rods by being forced through die openings which determine their diameters; the extrusion usually being directly into a cooling liquid bath. Upon their emergence from the die face, they are cut by rotating knives being positioned in the liquid bath; being cut into desired lengths of equal size. As the rods emerge from their orifices they are cut and immediately cooled by the bath, the bath is generally water. As they are thus cooled, they are also swept by water currents in the bath toward a collecting area of the apparatus, or they float out onto the bath surface and are floated out. Where the pellets do not float but sink into the pool of cooling liquid, they are then collected in a screen basket or flushed out through a base exit.

Advantageously, this invention extrudes plastic rods into the atmosphere of an enclosure, the rods are cut while a cooling spray plays on them and the cutting knives. The cooling spray is directed at the orifices (pellets) so that the cuttings are chilled and directed outwardly to prevent agglomeration. The surrounding walls of the enclosure are also continuously wetted by the knife rotation and spray and any pellets flung onto the enclosure sides are wash swept into the enclosure base where enough coolant is collected to cause them to float or to be swept out. Coolant may be conducted to the die face through the shaft carrying the cutting knives and directed radially and outwardly onto the die face or the coolant spray can be played onto the die through a ring shaped perforated conduit.

The length of the pellets is determined by the period of rotation, the number of blades utilized, and the rate of extrusion of the thermoplast. Advantageously, the rotation of the knife blades is separately controlled so as to be independent of the extrusion of the feed material. Any change in the extrusion rate can, then, be compensated by a corresponding change in the speed of rotation of the cutters.

Figure 2:
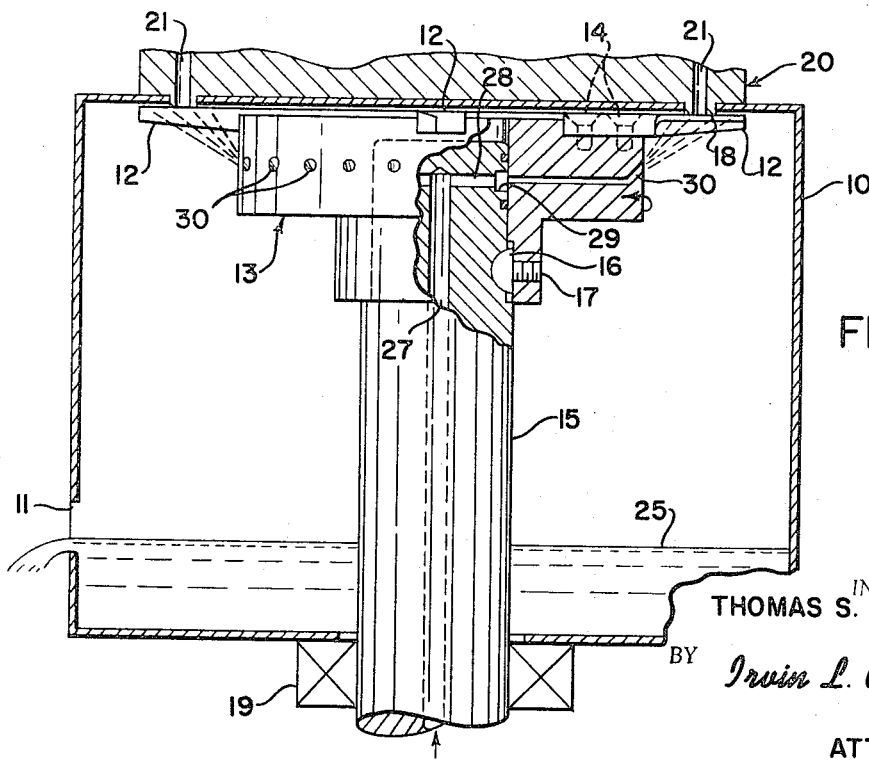
Figure 3:
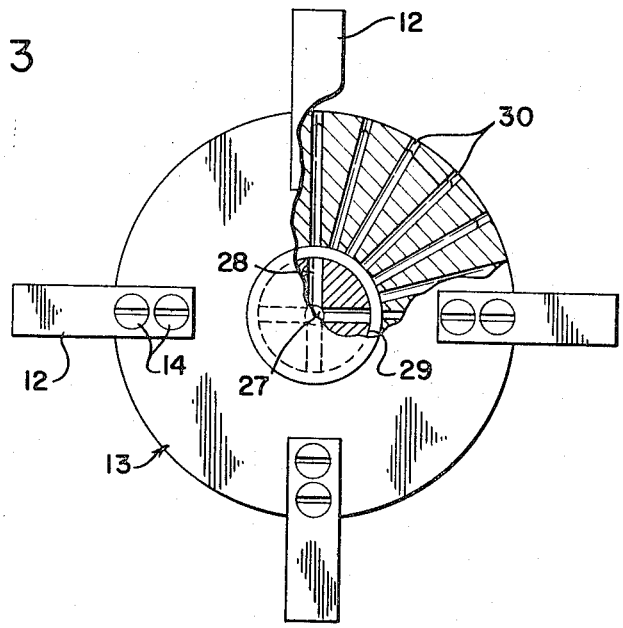
Figure 4:
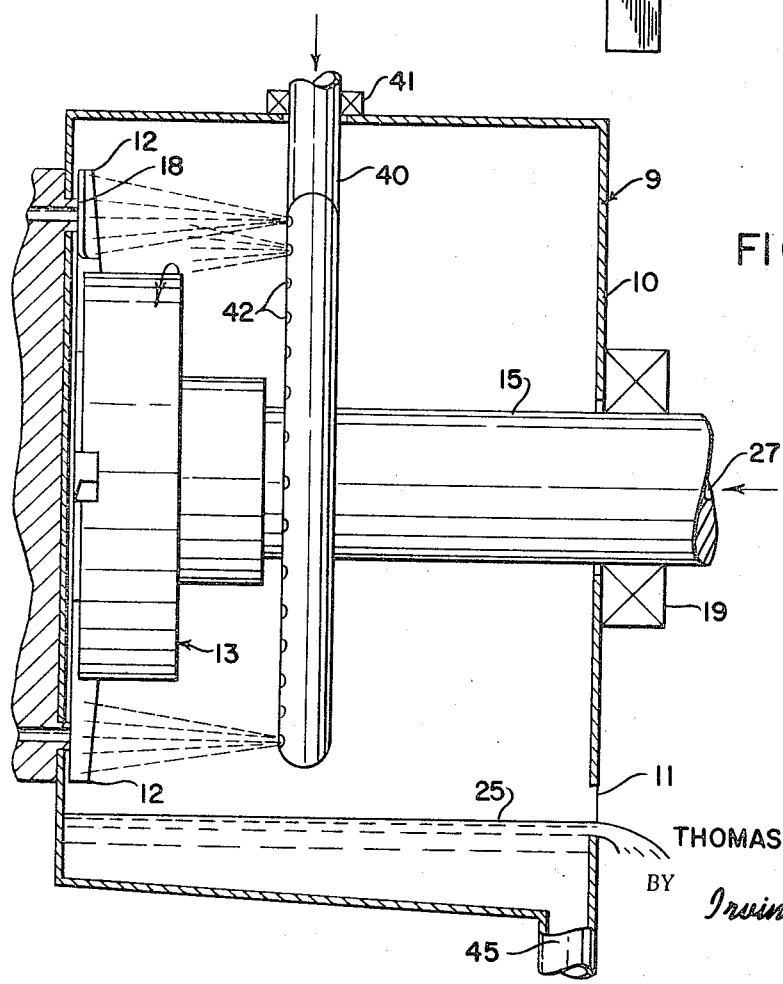

The features generally mentioned herein will be more specifically described and shown in the following specification and drawings, where:

FIGURE 1 represents a side view, in partial section, of the pelletizing apparatus of this invention;
FIGURE 2 also shows the pelleting apparatus, in partial section, positioned, however, vertically; being attached to a downwardly facing plastic rod extruder;
FIGURE 3 represents, in partial section, the cutter section taken along line 3—3 of FIGURE 1; and
FIGURE 4 represents an alternate cooling liquid spraying means of the die plate cutting area.

The pelleting unit 9 of FIGURE 1 is of a type that is adapted to be attached or fixed to the face of a plastic extruder apparatus 20 (partially shown), through which there is continually forced through a circular plurality of radially spaced passages 21 a thermoplastic material assuming the form of rods to be cut into pellets 23. The extruder face 20, as generally shown, may be a hardened die face secured to the extruder end and forming a part of it, the die face extending into the enclosure 10. The manner of joining the enclosure 10 containing the plastic rod cutting apparatus to the extruder face 20 is not shown inasmuch as there are numerous ways of doing it. The pelleting apparatus 9 is contained in the attached enclosure 10. It comprises the pellet cutting knives assembly, the cooling liquid spray means and pellet and liquid outlet. The enclosure 10 prevents the scattering of pellets upon cutting as a result of the centrifugal forces developed by the rotating knives 12 and the rotative spraying of the cooling liquid through the knives holder. Also, the enclosure 10 contains the cooling liquid that is collected.

More specifically, the cutting apparatus itself comprises cutting blades 12 positioned in a cutter head 13 mounted on the shaft 15. The knives are arranged therein securely at cutting angles so as to both shear and slice the emerging plastic rods through die passages 21 in cutting face 18. The blades 12 desirably are constructed of such shape as to centrifugally throw the granules 23 away from the die face 18 and from the cutter itself to avoid and prevent any sticking to each other or to adjacent parts of the apparatus.

The die face 18 and the cutter knives 12 as well as the adjacent enclosure 10 walls are continually wetted down by a circulating coolant through the knife supporting shaft and cutter head preventing any pellet adherence. As shown, the knife blades 12 are desirably equally spaced and fastened in the cutter head 13 by a suitable number of stud screws 14, while the cutter head itself is affixed to the supporting shaft 15 by means of a key 16 and locking stud 17. Where the shaft 15 extends through the wall of the enclosure 10, it is sealed by a protective gland 19. Of course, the shaft 15 is adapted to be adjusted toward and away from the cutting face 18 to compensate for wear of both the die surface and of the blades.

As the plastic material is extruded through the passages 21, it is cut into desirably sized pellets 23 by the rotating knives 12 along die face 18. Prior to and during cutting, the knives 12 and the die face 18 surface are spray cooled by the cooling liquid that flows through passage 27 in the center of the shaft 15, then radially outwardly through further lateral conduits 28 into an interior pressure equalizing circumferential channel 29. From the inside channel 29, the coolant-lubricant fiows through the further connecting, outgoing, radial passages 30 onto the die face 18 wetting and cooling it, and the knives and the pellets. The coolant passages 30 are designed to effect an equal flow distribution to the knives and die plate. The core passage 27 of the shaft 15 desirably is of a size required to carry sufficient coolant to maintain the channel 29 in the cutter head 13 under pressure in order to maintain equal distribution of its flow through the radial passages 30 onto the die plate 18, the knives 12, and onto the adjacent surfaces of the enclosure 10 to maintain them in a wet condition. The cutting surfaces, knives and die face and the surrounding wall area being thus wetted enable the cooled pellets to be immediately isolated from each other and swept from the walls into a base collecting pool 25 of the enclosure 10.

The cooled pellets 23 do not agglomerate but are collected and continually removed through an opening 11 of the enclosure 10 by the outflowing coolant. Any desirable method for continually removing the pellets 23 may be employed. One would be directing the flow through a screen based container, another over a travelling screen, etc. (not shown), thence into a bin. Meanwhile, the coolant is desirably recovered and passed through a sludge removal process then brought up to temperature for recirculation through the enclosure 10. Added coolant when necessary to replace that evaporated or carried away by the pellets should, of course, be provided for. Control can be had through the outlet opening.

At no time is it desired to submerge the cutter. The cutter knives, advantageously, operate in the enclosed atmosphere of the enclosure 10. The centrifugal spraying effecting a total wetting of the interior prevents any sticking of cut pellets, and the nonsubmergence of the cutting apparatus renders the apparatus to quick accessibility and thus a more troublefree operation.

The cooling liquid as shown in FIGURE 1 desirably is maintained at a predetermined depth for an automatic removal of pellets from the enclosure 10. As stated hereinbefore, the depth of the coolant may be controlled by the outlet size or opening 11 of the enclosure 10. Where, however, the pellets 23 tend to sink because of the density of the polymers being extruded, the pellets 23 can be, alternately, washed down and out of the enclosure 10 over its inclining base (see FIGURE 4) through a bottom positioned outlet 45. The removal of the cut pellets 23, thus, is obviously a matter of design of the enclosure 10.

Also, the pelleting apparatus 9 can be readily attached to a vertically positioned extruder, as indicated in FIGURE 2. As thermoplastic material is extruded through passages 21, it is cut to the desired lengths 23 by vertically positioned knives 12 rotating relative the die plate or face 18, meanwhile being continually sprayed with a coolant emanating from the cutter head 13. The cutting or die face 18 is continually wetted by the spray, cooling the pellets 23 which drop immediately downwardly into a depth of collected coolant 25 below, flowing out with it through the outlet opening 11.

Referring to FIGURE 3, the cutting head 13 may contain two, three, four or as many cutter blades 12 as desired in the particular design. The blades 12 are located and secured in the cutting head 13 as by means of studs 14. The cutting head 13, additionally, has within it a coolant receiving and distributing channel 29, and outlets 30 therefrom that distribute the coolant liquid through outgoing passages 30 onto the die face 18 through which rods, cut into pellets 23, are extruded. As previously stated, the coolant advantageously is admitted through the core passage 27 of the rotating shaft 15, then through a desired number of radially connected passages 28, into a common circular channel 29, thence outwardly therefrom through spray distributor passages 30. Depending upon design and intensity of spray required, the number of passages 30 can be limited as determined by experimentation to provide for the required volume of the liquid to cool and wet as well as lubricate the die face 18 and cutting knives 12 and adjacent wall surfaces. The passages 30 may be of such diameter so as to effect a fine spray, or a heavier flow depending upon the size and diameter and kind of pellets to be cut. This method of spraying the die face and wetting down or lubricating the adjacent areas advantageously avoids heavy turbulence within the container 10 were the cutters 12 submerged in a coolant; with the further resulting requirement that increased fresh coolant pressures for circulatory reasons would necessitate heavier materials for the enclosure 10 itself and the remaining apparatus.

An alternative method of spraying a coolant is to provide a stationary circumferential spray adjacent the cutting die face. Such spray means can be suitably positioned where required to face the emerging plastic rod. Angular water thrust could be had or avoided as that resulting from the rotation of the cutter head 13, and the possible angulation of the inwardly positioned rod sections prior to cutting to provide the pellet form desired. An off-the-cutting face circular spraying means, in such instance, would be advantageous. Such means would comprise a direct spray device as shown in FIGURE 4 where a liquid conducting conduit 39 enters the enclosure 10 through a gland 41 positioned in the top side to feed an annular sprayer 40. Sprayer 40 is of such form so as to follow the cutting face 18 and it is positioned at an advantageously desirable distance so that the spray therefrom can gently impinge upon the emerging plastic rods, the cutter face, the cutter knives and, where found necessary, onto the walls of the enclosure. The openings 42 within the annular, spaced, coolant conduit 40 can be of a size so as to provide for whatever sufficiency of coolant that may be required. Again, the liquid coolant desirably is collected in the base of the enclosure 10 to a sufficient depth to continually carry off or wash out pellets that drop into it, flowing out through the base outlet 45 or, selectively, where the pellets are of the floatable type, through an outlet 11 in the side.

The apparatus of this invention may be used for the production of various sized granules of any thermoplastic polymer capable of being cut. It is economic in construction and operation and can be readily adapted to extruders or injection apparatus. The described method of cooling is advantageously effective and it provides for granules that are compact and uniform and substantially free of dust or fines.

What is claimed is:

1. An apparatus for pelletizing extruded thermoplastic polymeric material comprising, an enclosure, a plurality of circularly positioned orifices in said enclosure through which a thermoplastic polymeric material is extruded in the form of rods, a shaft in said enclosure entering it from an opposing side facing said orifice, a rotary cutter means on said shaft in said enclosure being biased against said orifices, at least two cutting blades contained in said rotary cutter, a coolant spray means in said enclosure for sweeping said orifices and said extruding polymeric rods at the time of cutting, and a collecting trough in said enclosure below and independent of said cutter into which said pellets and spray are collected having an outlet for the continual removal of said cutting entrained coolant.

2. An apparatus for pelletizing extruded thermoplastic polymeric material comprising, an enclosure, a plurality of circularly positioned orifices in a die head in said enclosure through which a thermoplastic polymeric material is extruded in the form of rods, a shaft having a coolant passage through its interior positioned in said enclosure entering it from an opposing side facing said die head, a rotary cutter means on said shaft, said cutter means operating in a plane parallel with said die head and being biased against said orifices, at least two cutting blades contained in said rotary cutter, a coolant spray means in said cutter head connected to the said shaft passage for sweeping said die head at the time of cutting, and a collecting trough in the base of said enclosure and below and independent of said cutter means having an outlet for said cutting entrained coolant.

3. An apparatus for pelletizing extruded thermoplastic polymeric material comprising, an enclosure, a plurality of circularly positioned orifices in a die head positioned in said enclosure through which a thermoplastic polymeric material is extruded in the form of rods, a rotary cutter means operating parallel to said die head cutting said rods into pellets, an annular channel in said cutter means for receiving a cooling liquid, a shaft supporting said cutter means, at least two cutting blades contained in said rotary cutter, a conduit in the core of said shaft joining said annular channel in said cutter means, a plurality of outlets in said cutter means radially extending from said annular channel, said cooling liquid flowing through said shaft and outwardly radially from said cutter means sweeping said orifices and pellets at the time of cutting, and a collecting trough for said spray and pellets in said enclosure located below and being independent of said cutter means having an outlet for the continual removal of said pellet entrained coolant.

4. An apparatus for pelletizing extruded thermoplastic polymeric material comprising, an enclosure, an annular die head in said enclosure, a plurality of circularly positioned orifices in said die head through which a thermoplastic polymeric material is extruded in the form of rods, a rotary cutter means operating parallel to and being biased against said die head face for cutting material extruding therethrough, a shaft extending into said enclosure from an opposite direction facing said die head and supporting said cutter means, at least two cutting blades contained in said rotary cutter, an annular cooling liquid conduit in said enclosure positioned about the said shaft and generally facing said die head, a plurality of orifices in said conduit positioned therein at angles to sweep the die face and adjacent enclosure walls, a trough in said enclosure below and independent of said cutter means for collecting said spray and pellets, and an outlet for said pellet entrained coolant from said trough.

References Cited

UNITED STATES PATENTS

| 2,006,585 | 7/1935 | Downard | 18—12 X |
| 2,286,405 | 6/1942 | Gordon | 18—12 |
| 2,422,480 | 6/1947 | Gordon | 18—12 |
| 2,539,916 | 1/1951 | Ludington et al. | 18—12 |
| 2,594,894 | 4/1952 | Fehrenbach | 18—12 |
| 2,850,764 | 9/1958 | Evans et al. | |
| 2,862,243 | 12/1958 | Farr et al. | |
| 2,918,701 | 12/1959 | Hull et al. | |
| 3,230,582 | 1/1966 | Hoffman et al. | 18—12 |

WILLIAM J. STEPHENSON, *Primary Examiner.*